(12) United States Patent
Steiner et al.

(10) Patent No.: US 10,458,365 B2
(45) Date of Patent: Oct. 29, 2019

(54) DIRECT-INJECTION SUPERCHARGED INTERNAL COMBUSTION ENGINE HAVING WATER INJECTION, AND METHOD FOR OPERATING AN INTERNAL COMBUSTION ENGINE OF THIS TYPE

(71) Applicant: Ford Global Technologies, LLC, Dearborn, MI (US)

(72) Inventors: Bernd Steiner, Bergisch Gladbach (DE); Oliver Berkemeier, Bergisch Gladbach (DE); Krystian Dylong, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 15/403,043

(22) Filed: Jan. 10, 2017

(65) Prior Publication Data
US 2017/0198661 A1   Jul. 13, 2017

(30) Foreign Application Priority Data
Jan. 12, 2016   (DE) .................. 10 2016 200 237

(51) Int. Cl.
*F02M 25/03*   (2006.01)
*F02B 17/00*   (2006.01)
(Continued)

(52) U.S. Cl.
CPC ........... *F02M 25/03* (2013.01); *F02B 17/005* (2013.01); *F02D 13/0215* (2013.01);
(Continued)

(58) Field of Classification Search
CPC ............... F02M 25/03; F02M 25/0222; F02M 25/0227; F02M 43/04; F02M 49/02;
(Continued)

(56) References Cited

U.S. PATENT DOCUMENTS 5,174,247 A * 12/1992 Tosa ..................... F02B 47/02
123/25 C
5,651,346 A *  7/1997 Remmels ............... F02M 43/04
123/25 C
(Continued)

FOREIGN PATENT DOCUMENTS

DE          19955344  A1    6/2001
DE       102005010453  A1    9/2006
(Continued)

*Primary Examiner* — Syed O Hasan
(74) *Attorney, Agent, or Firm* — Geoffrey Brumbaugh; McCoy Russell LLP (57) ABSTRACT

Systems and methods are provided for a direct-injection engine having at least one cylinder head comprising at least one cylinder, in which each cylinder is assigned an injection nozzle which: is at least connectable to a fuel reservoir which serves for storing fuel, is secured in a nozzle holder, and is fitted with a nozzle needle which is displaceable in the direction of a longitudinal axis in a nozzle needle guide and, opens up at least one nozzle hole in order to introduce fuel. A control piston may be mounted movably on the injection nozzle, is displaceable in a translatory manner along the longitudinal axis of the injection nozzle between an inoperative position and a working position, and closes at least one fluid connection in the inoperative position and opens up same in the working position in order to introduce water into the associated cylinder.

20 Claims, 4 Drawing Sheets

(51) Int. Cl.
- *F02D 13/02* (2006.01)
- *F02M 25/022* (2006.01)
- *F02M 61/10* (2006.01)
- *F02M 61/14* (2006.01)
- *F02D 41/00* (2006.01)
- *F02M 43/04* (2006.01)
- *F02M 49/02* (2006.01)
- *F02F 1/24* (2006.01)

(52) U.S. Cl.
CPC ..... *F02D 41/0025* (2013.01); *F02M 25/0222* (2013.01); *F02M 25/0227* (2013.01); *F02M 43/04* (2013.01); *F02M 49/02* (2013.01); *F02M 61/10* (2013.01); *F02M 61/14* (2013.01); *F02F 1/242* (2013.01); *Y02T 10/18* (2013.01)

(58) Field of Classification Search
CPC ........ F02M 61/10; F02M 61/14; F02M 59/00; F02B 17/005; F02D 13/0215; F02D 19/061; F02D 19/0642
USPC ....................................................... 123/25 C
See application file for complete search history.

(56) References Cited

U.S. PATENT DOCUMENTS

| | | |
|---|---|---|
| 5,730,095 A | 3/1998 | Dohn et al. |
| 7,069,885 B2 | 7/2006 | Iida |
| 2003/0066497 A1* | 4/2003 | Stanglmaier ............ C10L 1/328 123/25 F |
| 2003/0098371 A1* | 5/2003 | Brenk ................. F02M 45/086 239/533.3 |
| 2009/0134246 A1 | 5/2009 | Cooke et al. |

FOREIGN PATENT DOCUMENTS

| | | |
|---|---|---|
| FR | 2927955 A3 | 8/2009 |
| JP | H0481556 A | 3/1992 |

* cited by examiner

DIRECT-INJECTION SUPERCHARGED
INTERNAL COMBUSTION ENGINE HAVING
WATER INJECTION, AND METHOD FOR
OPERATING AN INTERNAL COMBUSTION
ENGINE OF THIS TYPE

CROSS REFERENCE TO RELATED
APPLICATION

The present application claims priority to German Patent Application No. 102016200237.6, filed on Jan. 12, 2016. The entire contents of the above-referenced application are hereby incorporated by reference in its entirety for all purposes.

FIELD

The present description relates generally to methods and systems for water injection in a direct-injection internal combustion engine.

BACKGROUND/SUMMARY

In the development of internal combustion engines, it is constantly sought to minimize the fuel consumption and to reduce pollutant emissions, in particular the emissions of nitrogen oxide.

Fuel consumption is problematic especially in the case of spark ignition engines. The reason is the fundamental principle of operation of the conventional spark ignition engine, which is operated with a homogeneous fuel/air mixture, with the desired power output being adjusted by changing the filling of the combustion chamber, i.e. by means of quantity control. By adjusting a throttle valve provided in the intake tract, the pressure of the induced air downstream of the throttle valve can be reduced to a greater or lesser extent. Due to the throttling losses, the quantity control has thermodynamic disadvantages, especially in the part load range.

Injecting fuel directly into the combustion chamber of the at least one cylinder is regarded as a suitable measure for noticeably reducing fuel consumption, even in spark ignition engines. Dethrottling of the internal combustion engine is accomplished by using quantity controls in certain limits, as with the diesel engine.

By direct injection of the fuel into the combustion chamber, it is possible, in particular, to achieve a stratified charge in the combustion chamber, and this can make a significant contribution to the dethrottling of the spark ignition operating method since the mixture fed to the internal combustion engine can be made very significantly leaner with the aid of operation with a stratified charge.

For the reduction of the nitrogen oxide emissions of an internal combustion engine, a distinction can be made between two fundamentally different approaches. In a first approach, it is sought to influence the combustion process such that the fewest possible nitrogen oxides arise, that is to say are formed, during the combustion of the fuel in the first place. Since the formation of the nitrogen oxides requires not only an excess of air, but also high temperatures, combustion processes with relatively low combustion temperatures, so-called low temperature combustion methods (LTC), are inter alia expedient for the reduction of the nitrogen oxide emissions.

Low combustion temperatures may be realized by virtue of the ignition retardation being increased, and the rate of combustion being reduced. Both can be achieved through the admixing of combustion gases to the cylinder fresh charge or by increasing the exhaust-gas fraction in the cylinder fresh charge, whereby exhaust-gas recirculation (EGR) is regarded as a suitable measure for lowering the combustion temperature, specifically both external exhaust-gas recirculation, that is to say the recirculation of combustion gases from the exhaust-gas side to the intake side of the internal combustion engine, and internal exhaust-gas recirculation, that is to say the retention of exhaust gases in the cylinder during the charge exchange. With increasing exhaust-gas recirculation rate, the nitrogen oxide emissions can be considerably reduced.

To obtain a significant or adequate reduction in nitrogen oxide emissions, high exhaust-gas recirculation rates are required which may be of the order of magnitude of $x_{EGR} \approx 60\%$ to 70%. Therefore, the hot exhaust gas is cooled during the course of the recirculation. The cooling of the recirculated exhaust gas facilitates, or permits, the realization of high recirculation rates. The lowering of the temperature of the exhaust gas during the course of the cooling leads to an increase in density, and to a smaller exhaust-gas volume for a given exhaust-gas mass. Furthermore, the cooling of the recirculated exhaust gas assists the lowering of the combustion temperature, because this also results in the temperature of the entire cylinder fresh charge being lowered. There is nevertheless a conflict in the case of internal combustion engines having exhaust-gas turbocharging and simultaneous use of exhaust-gas recirculation since the recirculated exhaust gas is regularly extracted from the exhaust-gas removal system upstream of the turbine and is then no longer available for driving the turbine of the exhaust-gas turbocharger, and therefore the torque characteristics suffer.

As a result of the measures described above, not only the nitrogen oxide emissions, but also the soot emissions are reduced.

Another concept for realizing combustion processes with relatively low combustion temperatures in order to reduce the nitrogen oxide emissions relates to water injection, in which, in addition to the fuel, water is additionally introduced into the cylinder. The water introduced into the fired cylinder is—like the fuel—heated and evaporated, and therefore the temperature of the gas mixture in the cylinder drops, in particular because of evaporation enthalpy. In addition, the volume of the water is considerably increased by means of the evaporation, as a result of which the pressure in the cylinder rises. The latter increases the work output by the cylinder to the crankshaft or increases the power.

In contrast thereto, as a result of the course of combustion, conventional low temperature processes have on the contrary thermodynamic disadvantages, and therefore the efficiency is lower than in the case of a combustion process which is optimized exclusively in respect of the fuel consumption, i.e. in respect of the efficiency, without consideration of the pollutants emitted.

DE 199 55 344 B4 describes an assembly for injecting fuel into the cylinder of a direct-injection internal combustion engine, with which water can be additionally introduced into the cylinder. A membrane forms a nonreturn valve which permits water to flow into the cylinder via spray holes when a certain system pressure is exceeded, but does not permit the water to flow back. However, the pretensioned membrane does not permit a reproducible injection operation of water with a defined opening duration, which is determined by an opening time and a closing time. In addition, the durability of the membrane is a problem.

However, direct-injection internal combustion engines are in principle highly sensitive to changes and deviations in the mixture formation, in particular with regard to the quantity of fuel or quantity of water injected. There is comparatively little time for the injection of the fuel and water, the mixture preparation in the internal combustion engine, namely the preparation of the fuel and water by evaporation, and the thorough mixing of air, fuel vapor and water vapor, and also the ignition of the prepared mixture. For this reason too, very precise metering, i.e. proportioning of the quantity of water introduced, is absolutely essential. Unwanted deviations in the quantity of water injected can disadvantageously influence the operation of the internal combustion engine and even lead to increased pollutant emissions. In addition, rotational speed fluctuations of the internal combustion engine, misfires and backfires may occur.

A second approach for reducing the nitrogen oxide emissions consists in aftertreatment of the exhaust gas that is formed during the combustion, and of the pollutants contained therein. According to the prior art, to reduce the pollutant emissions, internal combustion engines may be equipped with various exhaust-gas aftertreatment systems. The exhaust-gas aftertreatment is also associated with disadvantages.

Firstly, the aftertreatment of exhaust gases is expensive, particularly due to the required coating of the catalytic converters with high-grade metals, wherein different aftertreatment systems regularly have to be provided for different pollutants, which may also lead to packaging problems.

Secondly, the operation of the exhaust-gas aftertreatment systems as such is associated with disadvantages, for example the use of fuel for maintaining the functionality of the exhaust-gas aftertreatment systems.

In one embodiment, the internal combustion engine is a supercharged internal combustion engine which is distinguished by high cylinder pressures and high exhaust-gas temperatures.

Supercharging serves primarily to increase the power of the internal combustion engine. Here, the air required for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and in a more expedient power-to-weight ratio. If the swept volume is reduced, it is thus possible, given the same vehicle boundary conditions, to shift the load collective toward higher loads, at which the specific fuel consumption is lower. Supercharging consequently assists in the continuous efforts in the development of internal combustion engines to minimize fuel consumption, i.e. to improve the efficiency.

As one example, the issues described above may be addressed by a direct-injection supercharged internal combustion engine having water injection and comprising, at least one cylinder head comprising at least one cylinder, in which each cylinder is assigned an injection nozzle which: is at least connectable to a fuel reservoir which serves for storing fuel; is secured in a nozzle holder serving as a receptacle; and is fitted with a nozzle needle which is displaceable in the direction of a longitudinal axis in a nozzle needle guide and, opens up at least one nozzle hole in order to introduce fuel, wherein a control piston is provided, which is mounted movably on the injection nozzle; is displaceable in a translatory manner along the longitudinal axis of the injection nozzle between an inoperative position and a working position; and closes at least one fluid connection in the inoperative position and opens up the at least one fluid connection in the working position in order to introduce water into the associated cylinder, wherein the control piston connects the at least one fluid connection in the working position to a chamber which, as part of a water supply system, is at least connectable via a supply line to a water reservoir which serves for storing water.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2 and 3 are shown approximately to scale

DETAILED DESCRIPTION

The following description relates to systems and methods for a direct-injection internal combustion engine (which may be supercharged) having water injection and having at least one cylinder head comprising at least one cylinder, in which each cylinder is assigned an injection nozzle which: is at least connectable to a fuel reservoir which serves for storing fuel, is secured in a nozzle holder serving as a receptacle, and is fitted with a nozzle needle which is displaceable in the direction of a longitudinal axis in a nozzle needle guide and, within the scope of an injection, opens up at least one nozzle hole in order to introduce fuel. Furthermore, this disclosure relates to a method for operating an internal combustion engine of this type.

An internal combustion engine of the type mentioned is used as a motor vehicle drive. As used herein, the term "internal combustion engine" includes diesel engines and spark ignition engines, but also hybrid internal combustion engines, i.e. internal combustion engines which are operated with a hybrid combustion method, and hybrid drives, which comprise in addition to the internal combustion engine an electric engine which is connectable in terms of drive to the internal combustion engine and which absorbs power from the internal combustion engine or outputs power additionally as a selectable auxiliary drive.

In one embodiment, a direct-injection supercharged internal combustion engine having water injection and having a least one cylinder head comprises at least one cylinder, in which each cylinder is assigned an injection nozzle which is at least connectable to a fuel reservoir which serves for storing fuel, is secured in a nozzle holder serving as a receptacle, and is fitted with a nozzle needle which is displaceable in the direction of a longitudinal axis in a nozzle needle guide and, within the scope of an injection, opens up at least one nozzle hole in order to introduce fuel. A control piston is additionally provided, which is mounted movably on the injection nozzle, is displaceable in a translatory manner along the longitudinal axis of the injection nozzle between an inoperative position and a working position, and closes at least one fluid connection in the inoperative position and opens up same in the working position in order to introduce water into the associated cylinder, wherein the control piston connects the at least one fluid connection in the working position to a chamber which, as part of a water supply system, is at least connectable via a supply line to a water reservoir which serves for storing water.

Each injection nozzle of a cylinder of the internal combustion engine, according to an embodiment is fitted with a control piston which permits or ensures a defined water injection. In addition, the control piston proves unproblematic in respect of durability.

The control piston is mounted movably on the outside of the injection nozzle and is displaceable in a translatory manner along the longitudinal axis of the injection nozzle. Whereas, in the inoperative position of the piston, a fluid connection to the cylinder remains closed, i.e. blocked, in a working position water can be introduced into the cylinder via an opened-up fluid connection, wherein each position of the control piston with the exception of the inoperative position constitutes a working position which is distinguished by an opened-up fluid connection through which water can pass. In each working position of the piston, the fluid connection is fed with water from a chamber. The chamber is part of a water supply system and is itself at least connectable to a water reservoir via a supply line.

According to the disclosure herein, force is exerted on the control piston by the pressure present in the chamber and the pressure which is present in the cylinder and acts on the piston via an open and blocked fluid connection. In addition, spring means can be provided which exert force on the control piston in the direction of the inoperative position, i.e. in the direction of the closed position. All of the forces acting on the control piston have an influence on the actuation, i.e. on the displacement of the piston, and therefore controlled displacement of the control piston is possible using the cylinder pressure and/or by means of control of the water pressure. The opening time and the closing time can therefore be defined, and therefore a defined opening duration can be set. The opening duration and the pressures which are present, together with the fluid connection which is provided, substantially determine the quantity of water introduced into the cylinder.

The concept according to the disclosure for the water injection is also distinguished in that it is suitable for retrofitting injection nozzles already commercially available or conventional fuel injection systems. This is because, at least as far as the inner parts are concerned, the injection nozzle itself does not need any modification. Only the spatial surroundings in which the injection nozzle is positioned and used has to be adapted in accordance with the concept according to the disclosure for the water injection. In this connection, cost advantages also arise, in particular in relation to concepts in which the injection nozzle has to be fitted with additional ducts and the like for the purpose of water injection.

The measures according to the disclosure relating to the water injection are suitable particularly for supercharged internal combustion engines which are subjected to a particularly powerful thermal load because of the higher exhaust-gas temperatures. Consequently, lowering the process temperatures is particularly advantageous.

Standards for the emission of pollutants from engines are becoming increasingly more restrictive. With the internal combustion engine according to the disclosure, future threshold values for pollutants can also be kept to by the internal combustion engine namely being operated with an additional water injection and the exhaust gas which is generated in the process and is low in pollutant being subsequently comprehensively aftertreated, as a result of which the pollutant concentrations in the exhaust gas are reduced once again.

Embodiments in which at least one exhaust-gas turbocharger is provided are advantageous. In comparison to a mechanical charger, the advantage of an exhaust-gas turbocharger consists in that a mechanical connection for transmitting power between the charger and the internal combustion engine does not exist or is not required. While a mechanical charger draws the energy required for its drive directly from the internal combustion engine, the exhaust-gas turbocharger uses the exhaust-gas energy of the hot exhaust gases.

Embodiments of the direct-injection supercharged internal combustion engine are advantageous in which each injection nozzle is fitted with spring means which exert force on the associated control piston in the direction of the inoperative position, i.e. in the direction of the closed position. The spring means provide the resetting forces for the control piston and ensure that no water inadvertently emerges from the chamber and is introduced into the cylinder. The spring means may be provided in the form of a pressure-loadable spring.

In this connection, in one embodiment of the direct-injection supercharged internal combustion engine, the spring means comprise at least one helical spring.

In embodiments of the direct-injection supercharged internal combustion engine, each control piston has a bushing-like shaft which is mounted displaceably in a translatory manner on the injection nozzle and at the end of which that faces away from the cylinder a blade-like element is arranged. The bushing-like shaft forms the mounting and guide of the control piston on the injection nozzle. The plate-like element can serve as a bearing or counterbearing for the spring means and/or in order to form the associated chamber.

Embodiments of the direct-injection supercharged internal combustion engine include where the shaft and the plate-like element of each control piston at the same time delimit the associated chamber.

In the case of direct-injection supercharged internal combustion engines, in which each injection nozzle is fitted with spring means which exert force on the associated control piston in the direction of the inoperative position, embodiments include where the spring means is arranged on that side of the plate-like element which faces away from the cylinder.

Embodiments of the direct-injection supercharged internal combustion engine include where the spring means are supported on the plate-like element.

Embodiments of the direct-injection supercharged internal combustion engine include where the spring means are supported on the injection nozzle. The spring means are then arranged or clamped in the individual case between the housing or the nozzle needle guide of the injection nozzle and the plate-like element.

Embodiments of the direct-injection supercharged internal combustion engine include where a venting line is provided on the side of the plate-like element which faces away from the cylinder. A second chamber or a cavity which, in the individual case, accommodates the spring means and from which a venting line can branch off, is arranged on that side of the plate-like element which is opposite the chamber. This structural measure takes account of the fact that the movable control piston can no longer completely seal the chamber, i.e. without any leakage, and therefore the task is set of venting the cavity which is arranged on that side of the plate-like element which is opposite the chamber.

Embodiments of the direct-injection supercharged internal combustion engine include where the bushing-like shaft has, at the end facing the cylinder, a wedge-shaped wall which closes the at least one fluid connection in the inoperative position. In the inoperative position, the wedge-shaped wall engages in the at least one fluid connection and closes the latter.

Embodiments of the direct-injection supercharged internal combustion engine include where the at least one fluid connection comprises at least two separate fluid ducts.

In particular, embodiments of the direct-injection supercharged internal combustion engine include where the at least one fluid connection comprises five to eight separate fluid ducts.

Embodiments of the direct-injection supercharged internal combustion engine include where the at least one fluid connection is designed—in the section transversely with respect to the longitudinal axis of the injection nozzle—as an annular duct which surrounds the injection nozzle around the full circumference.

Embodiments of the direct-injection supercharged internal combustion engine include where the nozzle holder of the injection nozzle is at least co-formed by the at least one cylinder head. If the nozzle holder is formed integrally with the cylinder head or is formed at least in parts by the cylinder head, numerous advantages arise. Firstly, the number of components, and therefore the costs for providing and installing the components, are reduced. Secondly, a compact design of the injection system together with control piston and/or water injection is made possible and therefore account is taken of the confined space conditions and the small space provision in the cylinder head.

Embodiments of the direct-injection supercharged internal combustion engine include where the chamber is at least co-formed by the at least one cylinder head. What has been stated with regard to the previous embodiment also applies analogously to the embodiment under discussion.

The second partial embodiment on which the disclosure is based, namely of presenting a method for operating a direct-injection supercharged internal combustion engine of a type described above, is achieved by a method which comprises the opening duration of the at least one fluid connection, which opening duration is determined by an opening time and a closing time, and therefore the quantity of water introduced into the cylinder, being co-determined by a pressure present in the cylinder.

What has already been stated for the internal combustion according to the disclosure also applies to the method according to the disclosure, and therefore reference is made in general at this juncture to the statements made above in respect of the internal combustion engine.

The pressure present in the cylinder acts via the fluid connection on the control piston, specifically both in the inoperative position and in every working position, i.e. when the fluid connection is open and closed. In this respect, the cylinder pressure is suitable less for opening the fluid connection than rather for closing or for assisting the closing operation since, as the combustion peters out, the cylinder pressure decreases and at the same time the need for injected water or for the water injection is obviated.

Embodiments of the method include where the closing time is co-determined by the pressure present in the cylinder.

Nonetheless, embodiments of the method include where the opening time is co-determined by the pressure present in the cylinder. This variant method is appropriate if a water injection is sought only at high loads, in which the pressure level in the cylinder generally rises. The control piston would then only be displaced out of the inoperative position and the fluid connection would then only be opened up if the cylinder pressure is sufficiently high, i.e. exceeds a predetermined value.

Embodiments of the method include where the opening duration of the at least one fluid connection is co-determined by a pressure present in the chamber.

Embodiments of the method include where the closing time of the at least one fluid connection is co-determined by a pressure present in the chamber. A reduction in the water pressure can be used in order to initiate the closing operation, i.e. to close the fluid connection.

In this connection, embodiments of the method include where the opening time of the at least one fluid connection is co-determined by a pressure present in the chamber. An increase in the water pressure can be used in order to initiate the opening operation, i.e. to open the fluid connection. In contrast to the cylinder pressure, the water pressure can be directly influenced or controlled.

Figure 1:
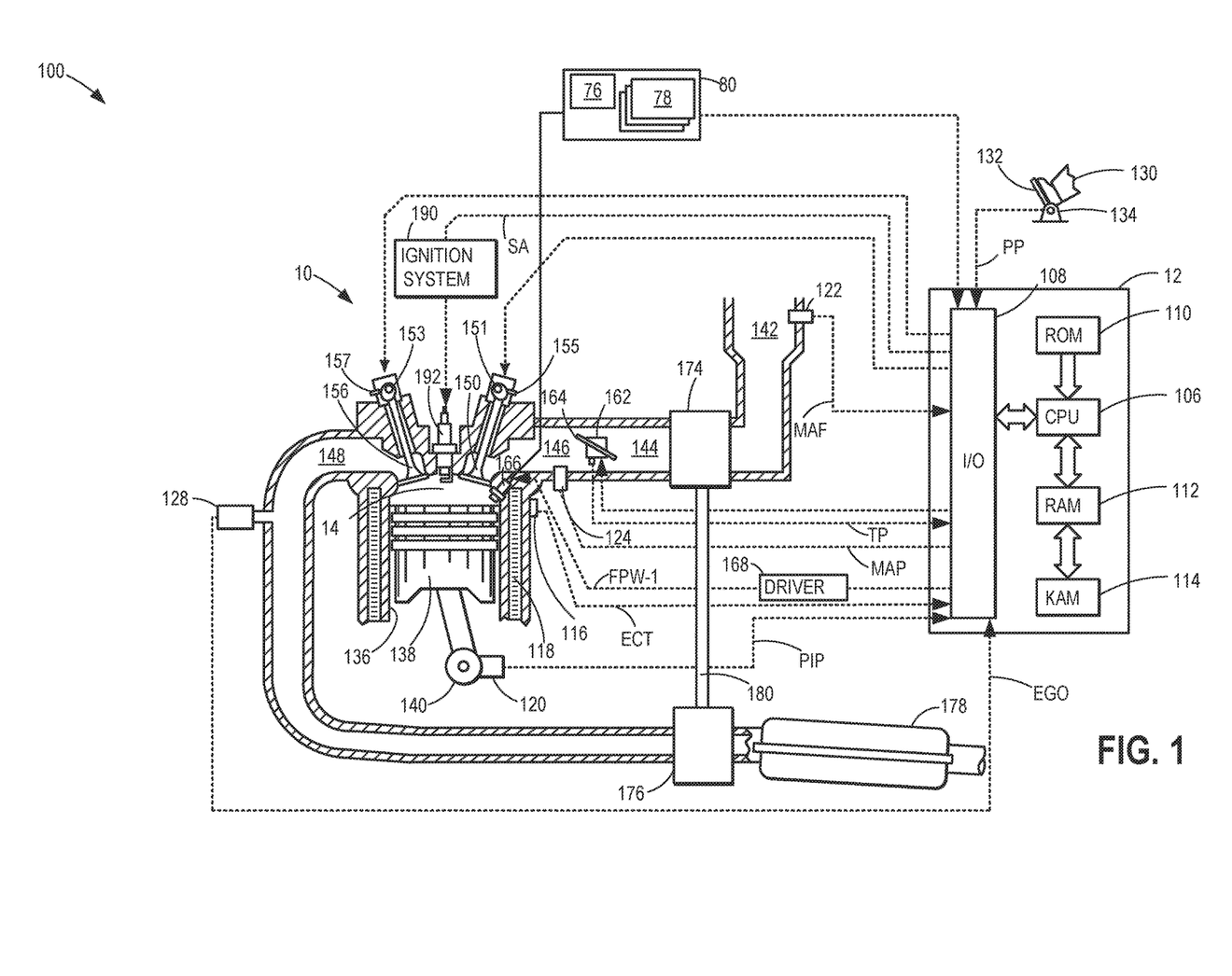
FIG. 1 shows a schematic diagram of an engine including a direct injector adapted to inject fuel and water.

Turning now to FIG. 1, an example vehicle system 100 including an internal combustion engine 10 is depicted. Engine 10 may be a dual fuel engine operating with a primary fuel and a secondary fluid, the secondary fluid being water or an alcohol-water mixture. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also referred to as a "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 may receive exhaust gases from other cylinders of engine 10 in addition to cylinder 14. An oxygen sensor 128 is shown coupled to exhaust passage 148 upstream of emission control device 178.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. A cam timing may be adjusted (by advancing or retarding the VCT system) to adjust an engine dilution in coordination with an EGR flow and/or a direct injection of a knock control fluid, thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one injector 166. Injector 166 is shown coupled directly to cylinder 14 for injecting fuel directly therein in proportion to the pulse width of signal FPW received from controller 12 via electronic driver 168. In this manner, injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Primary fuel may be delivered to injector 166 from a fuel and water injection system 80 including one or more tanks 78, reservoirs 76, fuel pumps, water pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, fuel tanks 78 may have a pressure transducer providing a signal to controller 12. It will be appreciated that, in an alternate embodiment, injector 166 may be a port injector providing fuel into the intake port upstream of cylinder 1. Knock control fluid (herein also referred to as secondary fluid, or water) may be stored in reservoir (e.g., water reservoir or water tank) 76. As elaborated herein, reservoir 76 may be included in the fuel and water injection system 80, coupled to a direct injector of the cylinder. This allows the secondary fluid (e.g., water) to be direct injected to provide knock control. The secondary fluid may also be coupled to a windshield wiper system (not shown) to be used for windshield wiping purposes.

The secondary fluid stored in reservoir 76 may include water or a combination of water and alcohol and one or more non-ionic surfactants. These may include, for example, ethoxylates, poly-alcohols, or a combination thereof. In general, these may be molecules with hydrophilic side-chains. The hydrophilic side-chains may include polyethylene oxide side-chains or a combination of polyethylene and polypropylene oxide side-chains. Non-limiting examples include Nonoxynol-9 and Triton X-100. As a result, the secondary fluid stored in reservoir 76 may be a non-electrolytic, non-corrosive aqueous fluid. When direct injected into a cylinder for knock control, the use of non-ionic components in the wiper fluid reduces the risk of contamination of the combustion chamber and exhaust system with aggressive and recalcitrant metal salts. In another example, the secondary fluid stored in reservoir 76 may be water or a water-alcohol mixture.

While reservoir 76 is depicted as being distinct from the one or more fuel tanks 78, it will be appreciated that in alternate examples, reservoir 76 may be one of the one of more fuel tanks 78. Reservoir 76 may be coupled to direct injector 166 so that secondary fluid can be directly injected into cylinder 14. During some conditions, in response to an indication of knock, an engine controller may directly inject secondary fluid into the cylinder to increase engine dilution and thereby control the untimely and unwanted detonation event. As discussed above, the secondary fluid stored in reservoir 76 may be formulated to include a combination of water and alcohol and optionally one or more non-ionic surfactants such as 40% methanol. These non-ionic components allow the secondary fluid to retain windshield cleaning properties while reducing the risk of contaminating and corroding the combustion chamber and exhaust system with aggressive and recalcitrant metal salts. Example compositions of the secondary fluid that may be used for knock control as well as windshield wiping include ethanol and methanol solutions without soap. Alternatively, the secondary fluid may comprise mostly water and not include the one or more non-ionic surfactants. In yet another example, the secondary fluid may comprise only water.

Fuel may be delivered by the injector to the cylinder during a single cycle of the cylinder. Further, the distribution and/or relative amount of fuel or knock control fluid delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks 76 and 78 in fuel and water injection system 80 may hold one or more fuels (e.g., primary fuels) and/or secondary fluids (e.g., knock control fluids such as water) with different qualities, such as different compositions. These differences may include different alcohol content, different water content, different octane, different heat of vaporizations, different fuel blends, different water contents, different flammability limits, and/or combinations thereof etc. In one example, fuels with different alcohol contents could include one fuel being gasoline and another fuel being ethanol or methanol. Other alcohol containing fuels could be a mixture of alcohol and water, a mixture of alcohol, water, etc. In still another example, both a first fuel and secondary fuel may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel or secondary fluid stored in the fuel tanks may vary frequently. The day to day variations in tank refilling can thus result in frequently varying fuel compositions, thereby affecting the fuel composition delivered by injector 166.

In some embodiments, the secondary fluid may be generated on board the vehicle from exhaust condensate, charge air cooler condensate, AC condensate drain, or rainwater drain. For example, both the water and the alcohol in the secondary fluid composition may be self-generated from water drained from the exhaust, charge air cooler, AC and/or rainwater drain, and alcohol separated from fuel in the fuel tank. By self-generating the components of the secondary fluid, the number of consumables on the vehicle system may be reduced.

While not shown, it will be appreciated that the engine may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system, and/or a knock sensor. In response to the signals received from the various sensors, the controller may operate various engine actuators. Example actuators include fuel injector 166, throttle 162, cams 151 and 153, etc.

Storage medium read-only memory 110 can be programmed with computer readable data representing instructions executable by processor 106 for performing the methods described below as well as other variants that are anticipated but not specifically listed. An example routine that may be performed is elaborated with reference to FIG. 4.

During operation, each cylinder within engine 10 typically undergoes a four stroke cycle: the cycle includes the intake stroke, compression stroke, expansion stroke, and exhaust stroke. During the intake stroke, generally, the exhaust valve 156 closes and intake valve 150 opens. Air is introduced into cylinder 14 via intake air passage 146, and piston 138 moves to the bottom of the cylinder so as to increase the volume within cylinder 14. The position at which piston 138 is near the bottom of the cylinder and at the end of its stroke (e.g., when cylinder 14 is at its largest volume) is typically referred to by those of skill in the art as bottom dead center (BDC). During the compression stroke, intake valve 150 and exhaust valve 156 are closed. Piston 138 moves toward the cylinder head so as to compress the air within cylinder 14. The point at which piston 138 is at the end of its stroke and closest to the cylinder head (e.g., when cylinder 14 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 156 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Figure 2:
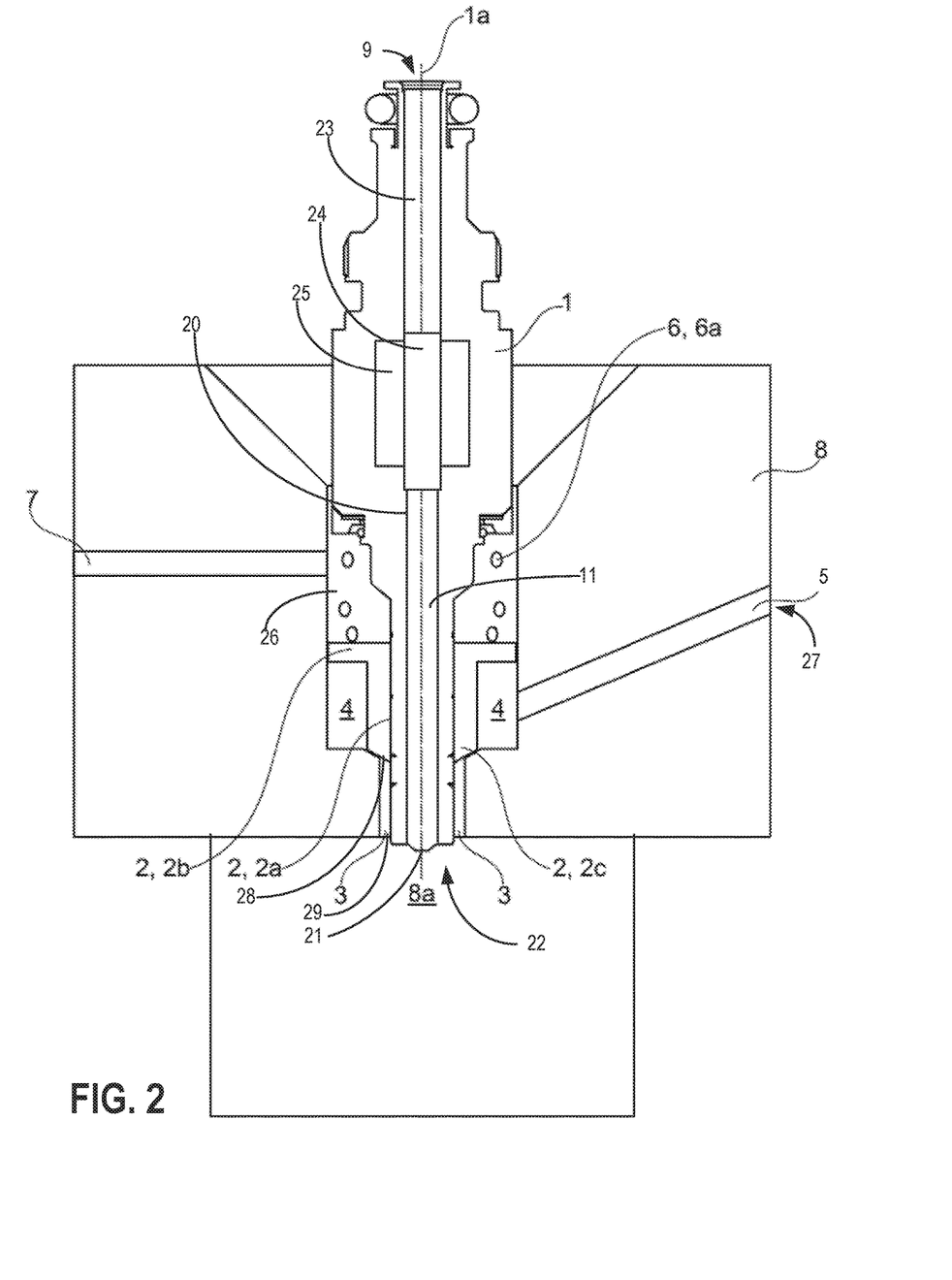
FIG. 2 shows a schematic illustration of a fragment of an injection system of a first embodiment of the internal combustion engine together with a control piston of an injector in the inoperative position.

Turning to FIG. 2, a schematic illustration of a fragment of the fuel injection system of a first embodiment of the supercharged internal combustion engine together with the water injection and a control piston 2 in the inoperative position is shown.

A detail is illustrated of a cylinder head 8 which accommodates the injection nozzle 1 of the fuel injection system (e.g., fuel and water injection system 80 shown in FIG. 1) of a cylinder 8a (e.g., cylinder 14 shown in FIG. 1) of the internal combustion engine. For the purpose of direct injection of fuel, each cylinder 8a is assigned an injection nozzle (also referred to herein as an injector, which may be similar to injector 166 shown in FIG. 1) which is at least connectable to a fuel reservoir (e.g., fuel reservoir 78 shown in FIG. 1) via a fuel inlet 9, which serves for storing fuel, and is fitted with a nozzle needle 11 which is displaceable in the direction of its longitudinal axis 1a in a nozzle needle guide 20 which, within the scope of an injection, opens up at least one nozzle hole 21 for the purpose of introducing fuel into the cylinder 8a. The nozzle hole is located at a nozzle tip (e.g., tip end positioned within the cylinder) 22 of the injection nozzle 1. As shown in FIG. 2, the nozzle hole 21 is centered along the longitudinal axis 1a. However, in alternate embodiments, the nozzle tip 22 of the injection nozzle 1 may include a plurality of holes symmetrically positioned around the longitudinal axis 1a. Thus, the plurality of nozzle holes 21 may surround the longitudinal axis, or centerline of the injection nozzle 1. The nozzle hole 21 (or holes) is fluidly coupled with fuel inlet (and thus the fuel reservoir) via a fuel passage 23. For example, as shown in FIG. 2, the nozzle needle 11 is biased against the nozzle tip 22 and the nozzle hole 21 via a spring. The nozzle needle is actuated via a solenoid 25. For example, when the solenoid is energized, the nozzle needle 11 may be moved along the longitudinal axis 1a, away from the nozzle tip, nozzle hole, and in a direction away from the cylinder (and toward the fuel inlet). As a result, the nozzle needle 11 uncovers the nozzle hole 21 and fuel may be injected from the fuel passage 23 to the cylinder 8a via the nozzle hole 21. In this way, fuel injection into the cylinder 8a via the nozzle hole 21 is actuated via the solenoid 25 which is in electronic communication with a controller of the engine (e.g., controller 12 shown in FIG. 1). Thus, an activation signal from the controller may activate (or deactivate) the solenoid and thus move the nozzle needle and result in fuel injection. The solenoid only controls fuel injection from the injection nozzle 1 and does not control water injection, as described further below.

In the present case, the cylinder head 8 serves as a nozzle holder, i.e. for accommodating the injection nozzle 1.

Figure 3:
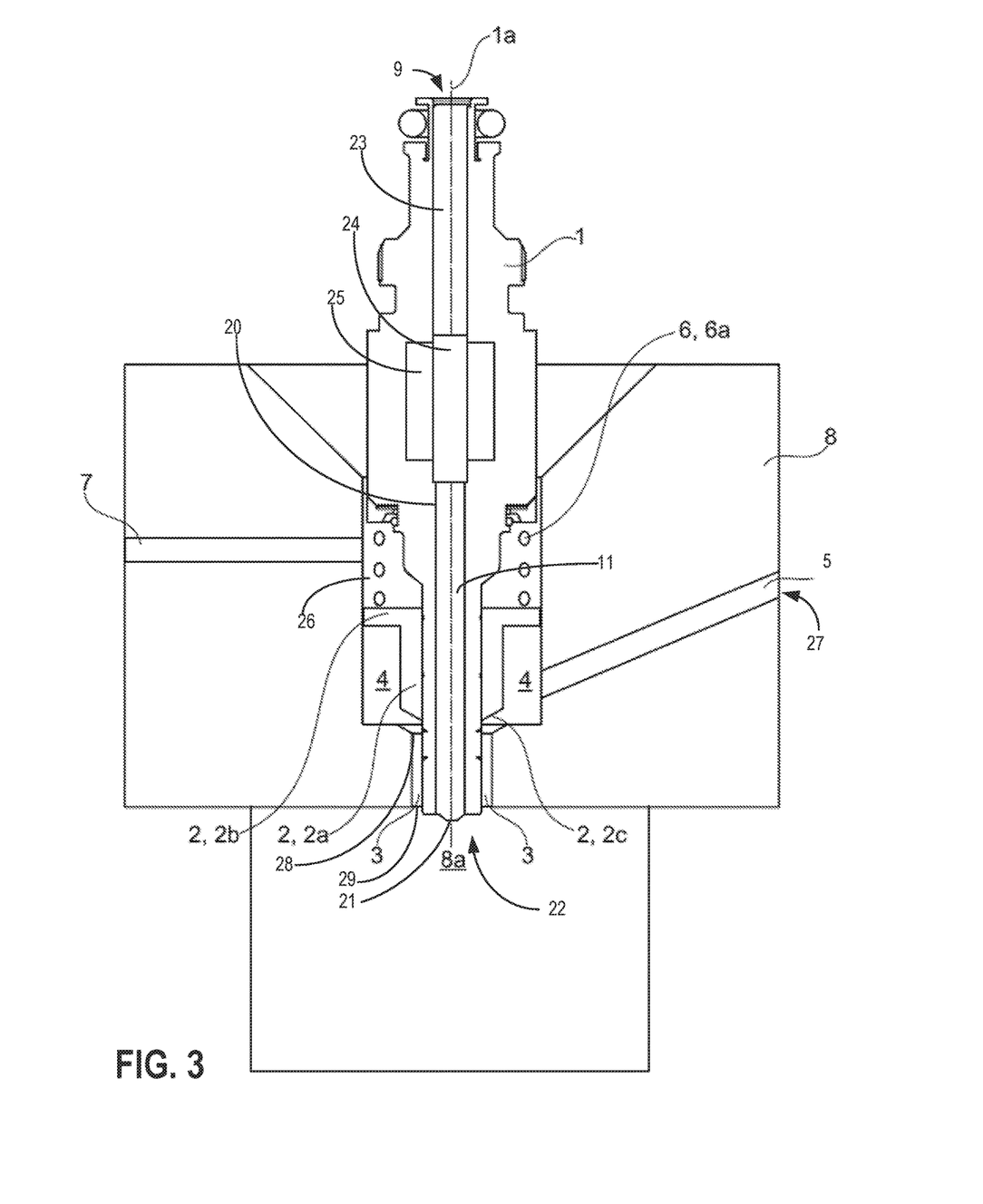
FIG. 3 shows a schematic illustration of a fragment of the fuel injection system of the first embodiment of the internal combustion engine together with the control piston in an operating position.

For the purpose of water injection, a control piston 2 is provided which is mounted movably on the injection nozzle 1 and is displaceable in a translatory manner along the longitudinal axis 1a of the injection nozzle 1 between an inoperative position (FIG. 2) and a working position (FIG. 3).

The control piston 2 has a bushing-like shaft 2a which is mounted displaceably in a translatory manner on the injection nozzle 1 and forms the mounting and guide of the control piston 2 on the injection nozzle 1. A plate-like element 2b is arranged at that end of the control piston 2 which faces away from the cylinder 8a, said element serving as a bearing for spring means 6 which are provided and which exert force on the control piston 2 in the direction of the inoperative position, i.e. in the direction of the closed position. A helical spring 6a serving as the spring means 6 is supported at its other end on the injection nozzle 1, and therefore the helical spring 6a is clamped between the housing of the injection nozzle 1 and the plate-like element 2b. The cavity (also referred to herein as a chamber or spring chamber) 26 in which the spring means 6 are arranged is fitted with (e.g., fluidly coupled to) a venting line 7.

The shaft 2a and the plate-like element 2b of the control piston 2 co-form a chamber (e.g., fluid or water chamber) 4 which, as part of a water supply system, is at least connectable via supply line 5 to a water reservoir (e.g., water reservoir 76 shown in FIG. 1), via a water inlet 27, which serves for storing water. The chamber 4 can be connected to the cylinder 8a via a fluid connection (also referred to herein as a fluid or water passage) 3, by displacement of the control piston 2 into a working position, in order to introduce water into the cylinder 8a. The water connection 3 includes an inlet (e.g., inlet end) 28 and an outlet (e.g., outlet) 29. The inlet 28 is connected to the chamber 4 and the outlet is positioned at the nozzle tip 22 and is the end of the fluid connection 3 from which water is injected into the cylinder 8a. As shown in FIG. 2, the outlet 29 is positioned at the nozzle tip, on an outside of the nozzle hole 21, relative to the longitudinal axis. In one example, the outlet 29 (and the water connection 3) is annular and surrounds an outside of the nozzle hole 21 and the nozzle needle 11. In this way, a water spray from outlet 29 may circumferentially surround a fuel spray from nozzle holes 21 if water injection and fuel injection occur at the same time.

Water within the injection nozzle 1 may only reside within the supply line 5, the chamber 4, and the fluid connection 3. Water is not located within the fuel passage 23, the nozzle needle 11, or the nozzle hole 21. Further, water may not be present within the spring chamber 26 or the venting line 7. Likewise, fuel may not be present within the supply line 5, the chamber 4, and the fluid connection 3.

In the inoperative position illustrated in FIG. 2, the control piston 2 closes said fluid connection 3 which is designed as an annular duct and surrounds the injection nozzle 1 and nozzle hole 21 around the entire circumference. The bushing-like shaft 2a of the control piston 2 here engages at its end facing the cylinder 8a in the fluid connection 3 by means of a wedge-shaped wall 2c and closes said fluid connection 3.

FIG. 3 shows a schematic illustration of a fragment of the fuel injection system of the first embodiment of the supercharged internal combustion engine together with the water injection and a control piston 2 in an operating position. This figure will be explained only as a supplement to FIG. 2, and therefore reference is furthermore made to FIG. 2. The same reference signs have been used for the same parts.

In the working position shown, the control piston 2 compresses the spring means 6 and moves away from the nozzle tip 22 and toward the fuel inlet 9. As a result, the wedge-shaped wall 3c of the piston 2 uncovers the inlet 28 of the fluid connection 3 and thus water may be introduced (e.g., injected) into the associated cylinder 8a, for which purpose the control piston 2 connects the fluid connection 3 to a chamber 4. Specifically, when the piston 2 moves away from and uncovers the inlet 28, the fluid connection 3 is fluidly connected to chamber 4 and thus may inject water within the chamber 4, supplied from supply line 5.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 4:
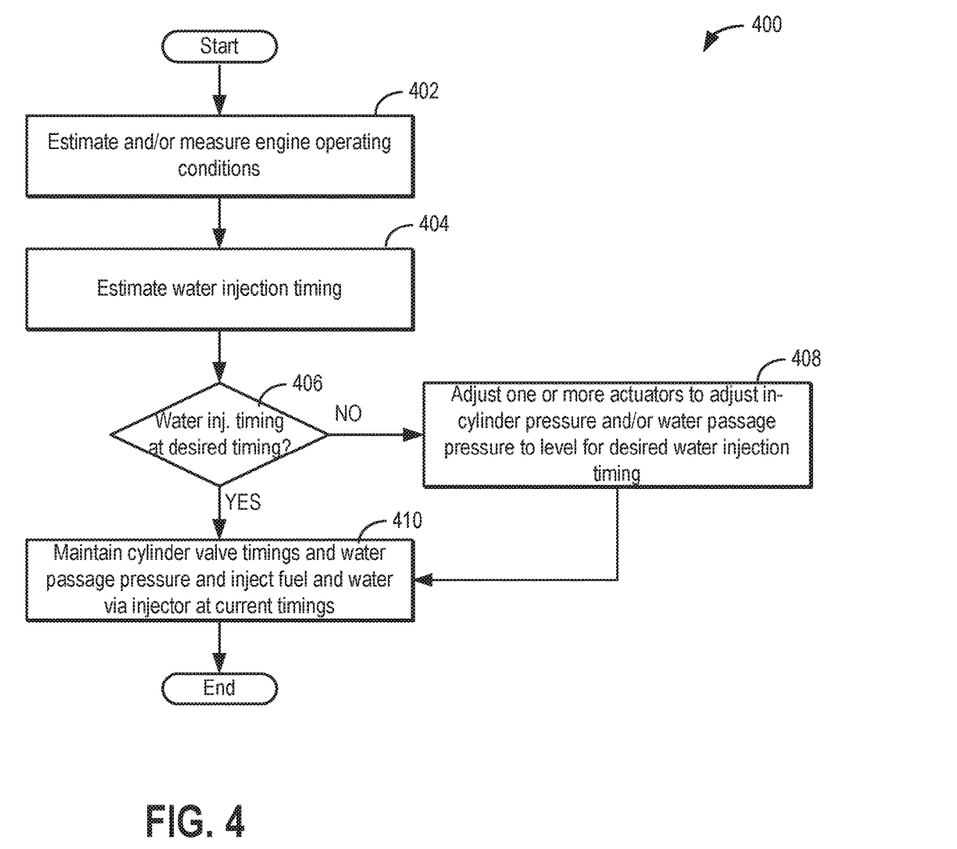
FIG. 4 shows a flow chart of a method for adjusting a water injection timing of an injector based on a fuel injection timing of the injector.

FIG. 4 shows a flow chart of a method 400 for adjusting a water injection timing of an injector (such as injector 166 shown in FIG. 1 and injection needle 1 shown in FIGS. 2-3) based on a fuel injection timing of the injector. Instructions for carrying out method 400 may be executed by a controller (such as controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may employ an actuator (such as a solenoid) of an injector (or injection nozzle) to inject fuel at a desired fuel injection timing. In another example, the controller may employ various valve timing actuators to adjust an intake valve timing of an intake valve and/or exhaust valve timing of an exhaust valve and thus adjust an in-cylinder pressure of the cylinder which the injector is directly coupled to.

Method 400 begins at 402 by estimating and/or measuring engine operating conditions. Engine operating conditions may include engine speed and/or load, operator torque demand, engine temperature, mass air flow, combustion air-fuel ratio, exhaust air-fuel ratio, water pressure in a water chamber (e.g., chamber 4 shown in FIGS. 2-3) and/or water supply line (e.g., supply line 5 shown in FIGS. 2-3) of the injector, a fuel injection timing of the injector, an intake valve timing of an intake valve of the cylinder, an exhaust valve timing of an exhaust valve of the cylinder, an in-cylinder pressure of the cylinder, a peak cylinder pressure of the cylinder, etc.

At 404, the method includes estimating water injection timing of the injector (e.g., a time in the cylinder cycle at which water is injected into the cylinder via the injector). For example, as introduced above, once the gas pressure within the cylinder increases above a threshold pressure, the control piston (e.g., piston 2 shown in FIGS. 2-3) overcomes the biasing force of the spring (e.g., spring 6 shown in FIGS. 2-3) and moves away from the nozzle tip and cylinder, along the longitudinal axis of the injector. As a result, water is injected into the cylinder via the injector. Once the cylinder pressure decreases back below the threshold pressure, the control piston returns to its base position and water injection stops. Thus, in one example, the controller may determine an estimate of the water injection timing based on the in-cylinder pressure over a complete cylinder cycle (e.g., via measuring or estimating in-cylinder pressure during a complete cylinder cycle, the cylinder cycle including an intake stroke, compression stroke, expansion stroke, and exhaust stroke, in one example). Specifically, the controller may determine when the cylinder pressure will reach the threshold pressure within the engine cycle and then equate this timing to the timing of injecting water. As another example, the controller may estimate the in-cylinder pressure throughout the cylinder cycle, and thus the water injection timing of the injector, based on the intake valve timing and/or exhaust valve timing of the cylinder. In some examples, the water injection timing may additionally be based on the fuel injection timing. For example, the controller may determine the water injection timing on a calculation using a look-up table with the inputs being intake valve timing, exhaust valve timing, and/or fuel injection timing and the output being the water injection timing.

At 406, the method includes determining whether the water injection timing estimated at 404 is at the desired water injection timing. In one example, the desired water injection timing may be a timing that is different than and does not overlap with the fuel injection timing of the same injector. For example, since the water passage of the injector surrounds the fuel nozzle hole(s), if both water and fuel were injected from the injector at the same time, the water spray would surround the fuel spray entering the cylinder. The water spray may interfere with the fuel spray, and thus, in some cases, this may not be desirable. In another example, it may be desirable for the fuel injection and water injections from the same injector to overlap. Thus, the controller may determine at 406 what the desired water injection timing is based on the current fuel injection timing and engine operating conditions. For example, if it is undesirable for the fuel and water sprays to overlap and occur at the same time, the controller may determine at 406 that the desired water injection timing is before or after a time at which the injector injects fuel. Thus, in one example, the desired water injection timing may be an earlier or later timing relative to the fuel injection timing when the current water injection timing overlaps with the current fuel injection timing.

If the water injection timing is not at the desired timing, the method continues to 408 to adjust one or more engine actuators (such as the actuators discussed above with reference to FIG. 1) to adjust the in-cylinder pressure and/or the water passage pressure of the water passages of the injector (e.g., fluid connection 3, chamber 4, and/or supply line 5) to levels that produce the desired water injection timing. As one example, the method at 408 may include adjusting a valve actuator of the intake valve and/or exhaust valve of the cylinder to adjusting the intake valve timing and/or exhaust valve timing. This may result in the in-cylinder pressure being adjusting and thus the timing of water injection being moved to the desired timing. As one example, the controller may determine when in the cylinder cycle the threshold pressure should occur based on the desired water injection timing (e.g., the threshold pressure should occur at the desired water injection timing). Then, the controller may determine the corresponding intake valve timing and/or exhaust valve timing that will produce the threshold pressure at the desired timing. As one example, the controller may determine the intake and/or exhaust valve timings using a look-up table stored in memory where the desired water injection timing, or the timing of the threshold pressure, is the input and the intake and/or exhaust valve timings are the outputs. The controller may then actuate the valve actuators (e.g., cam actuation systems 153 and 151) to adjust the intake valve and/or exhaust valve to the determined timings that produce the desired water injection timing. As another example, the method at 408 may additionally or alternatively include adjusting a pressure of the fluid (e.g., water) within the injector to adjust the water injection timing to the desired timing. As one example, this may include increasing or decreasing the supply pressure of water supplied to the injector via the supply line (e.g., via adjusting a water injection pump of the water injection system, such as system 80 shown in FIG. 1).

Alternatively at 406, if the water injection timing is at the desired timing, the method continues to 410 to maintain the intake valve timing, the exhaust valve timing, and water passage pressures at the current levels and inject fuel and water via the injector at the currently set timings. The method then ends.

The technical effect of injecting fuel directly into a cylinder via a fuel nozzle hole of a fuel injector at a first timing; injecting water directly into the cylinder via a water passage of the fuel injector at a second timing, the water passage surrounding an outside of the fuel nozzle hole; and adjusting the second timing based on the first timing is injecting a desired amount of fuel and water into the cylinder at desired timings, thereby increasing engine efficiency and improving engine performance. For example, by adjusting the timing of the water injection based on the timing of the fuel injection, the water injection and fuel injection sprays may be separated so that they do not occur at the same time and thus do not interfere with one another (due to the arrangement of the water passage outlet of the injector surrounding the fuel nozzle hole of the injector).

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A direct-injection supercharged internal combustion engine having water injection, comprising:
at least one cylinder head comprising at least one cylinder, in which each cylinder is assigned an injection nozzle which:
is at least connectable to a fuel reservoir which serves for storing fuel;
is secured in a nozzle holder serving as a receptacle; and
is fitted with a nozzle needle which is displaceable in a direction of a longitudinal axis in a nozzle needle guide and opens up at least one nozzle hole at a nozzle tip in order to introduce fuel, the nozzle needle actuated via a solenoid in electronic communication with a controller of the engine, wherein a control piston is provided that surrounds an entire circumference of the nozzle needle relative to the longitudinal axis, which:
is mounted movably on the injection nozzle;

is displaceable in a translatory manner along the longitudinal axis of the injection nozzle between an inoperative position and a working position by actuation via pressure and spring forces acting on the control piston; and closes at least one fluid connection in the inoperative position and opens up the at least one fluid connection in the working position in order to introduce water into an associated cylinder via an outlet of the at least one fluid connection arranged at the nozzle tip, outside of the nozzle hole relative to the longitudinal axis, wherein the control piston connects the at least one fluid connection in the working position to a chamber which, as part of a water supply system, is at least connectable via a supply line to a water reservoir which serves for storing water, where water for introduction into the associated cylinder via the outlet of the at least one fluid connection is separated within the injection nozzle from fuel for introduction into the associated cylinder via the nozzle hole.

2. The direct-injection supercharged internal combustion engine as claimed in claim 1, wherein each injection nozzle is fitted with spring means which exert force on an associated control piston in a direction of the inoperative position and wherein actuation of movement of the control piston into each of the inoperative position and the working position is passive and not electronically controlled.

3. The direct-injection supercharged internal combustion engine as claimed in claim 1, wherein the control piston has a shaft which is mounted displaceably in the translatory manner on the injection nozzle and at an end of the shaft that faces away from the cylinder, a plate element of the control piston is arranged.

4. The direct-injection supercharged internal combustion engine as claimed in claim 3, wherein the shaft and the plate element of the control piston together delimit an associated chamber.

5. The direct-injection supercharged internal combustion engine as claimed in claim 3, in which each injection nozzle is fitted with spring means which exert force on an associated control piston in a direction of the inoperative position, wherein the spring means are arranged on a side of the plate element which faces away from the cylinder.

6. The direct-injection supercharged internal combustion engine as claimed in claim 5, wherein the spring means are supported on the plate element.

7. The direct-injection supercharged internal combustion engine as claimed in claim 5, wherein the spring means are supported on the injection nozzle.

8. The direct-injection supercharged internal combustion engine as claimed in claim 3, wherein a venting line is provided on a side of the plate element which faces away from the cylinder.

9. The direct-injection supercharged internal combustion engine as claimed in claim 3, wherein the shaft has, at another end of the shaft facing the cylinder, a wedge-shaped wall which closes the at least one fluid connection in the inoperative position.

10. The direct-injection supercharged internal combustion engine as claimed in claim 9, wherein the at least one fluid connection comprises at least two separate fluid ducts.

11. The direct-injection supercharged internal combustion engine as claimed in claim 10, wherein the at least one fluid connection comprises five to eight separate fluid ducts.

12. The direct-injection supercharged internal combustion engine as claimed in claim 1, wherein the nozzle holder of the injection nozzle is at least co-formed by the at least one cylinder head.

13. The direct-injection supercharged internal combustion engine as claimed in claim 1, wherein the chamber is at least co-formed by the at least one cylinder head.

14. A method, comprising:
injecting fuel directly into a cylinder via a fuel nozzle hole of a fuel injector at a first timing, where the injecting fuel is electronically actuated via a solenoid coupled with a nozzle needle;
injecting water directly into the cylinder via a water passage of the fuel injector at a second timing, the water passage surrounding an outside of the fuel nozzle hole, where injecting water includes not injecting fuel and is actuated via fluid pressures acting on a control piston; and
adjusting the second timing based on the first timing by adjusting a pressure inside the cylinder.

15. The method of claim 14, wherein adjusting the second timing based on the first timing by adjusting the pressure inside the cylinder includes adjusting the pressure inside the cylinder via adjusting one or more of a timing of an intake valve of the cylinder and a timing of an exhaust valve of the cylinder.

16. The method of claim 14, wherein injecting water directly into the cylinder includes moving the control piston, passively, within the fuel injector away from the cylinder, along a longitudinal axis of the injector, to fluidly couple the water passage to a chamber of the fuel injector, the chamber surrounding the nozzle needle of the fuel injector and fluidly coupled to a water supply line.

17. The method of claim 14, wherein adjusting the second timing based on the first timing includes adjusting the second timing to have an earlier or later timing relative to the first timing in response to the second timing overlapping with the first timing.

18. A cylinder head of an engine, comprising:
an injection nozzle mounted within the cylinder head, the injection nozzle, comprising:
a nozzle needle centered along a longitudinal axis of the injection nozzle and actuated electronically via a solenoid;
a nozzle tip including a nozzle hole fluidly coupled to a fuel passage of the injection nozzle when the nozzle needle is retracted away from the nozzle hole;
one or more fluid passages with an outlet positioned at the nozzle tip, on an outside of the nozzle hole relative to the longitudinal axis, where the one or more fluid passages are fluidly coupled to a fluid chamber of the injection nozzle when a piston surrounding the nozzle needle is retracted away from an inlet of the one or more fluid passages, the piston actuated via pressures in a cylinder of the cylinder head and the fluid chamber; and
a water supply line formed within the cylinder head and fluidly coupled to the fluid chamber, where water supplied from the water supply line resides only in the water supply line, fluid chamber and one or more fluid passages within the injection nozzle.

19. The injection nozzle of claim 18, further comprising a controller with memory including instructions that when executed by the controller cause the controller to:
send an activation signal to the solenoid of the injection nozzle to move the nozzle needle and inject fuel from the injection nozzle; and send an activation signal to one or more of an actuator of
a cylinder intake valve or exhaust valve and an actuator
of a water injection system to adjust an in-cylinder
pressure and/or water pressure of the water supply line
to adjust a timing of water injection from the injection
nozzle.

20. The injection nozzle of claim 18, further comprising a spring disposed within a spring chamber surrounding the nozzle needle, the spring positioned against the piston and further comprising a venting line formed within the cylinder head and fluidly coupled to the spring chamber.

* * * * *